US012560537B2

(12) United States Patent
Schmitt et al.

(10) Patent No.: US 12,560,537 B2
(45) Date of Patent: Feb. 24, 2026

(54) ULTRA LOW-NA REFRACTIVE INDEX PROFILING SYSTEM AND METHOD FOR FILTERING OUT SEVERELY DISTURBING DIFFRACTION EFFECTS

(71) Applicant: Heraeus Quartz North America LLC, Buford, GA (US)

(72) Inventors: Maximilian Schmitt, Buford, GA (US); Evan P. Green, Buford, GA (US)

(73) Assignee: HERAEUS QUARTZ NORTH AMERICA LLC, Buford, GA (US)

( * ) Notice: Subject to any disclaimer, the term of this patent is extended or adjusted under 35 U.S.C. 154(b) by 133 days.

(21) Appl. No.: 18/646,265

(22) Filed: Apr. 25, 2024

(65) Prior Publication Data

US 2024/0369479 A1 Nov. 7, 2024

Related U.S. Application Data

(60) Provisional application No. 63/463,621, filed on May 3, 2023.

(51) Int. Cl.
G01N 21/41 (2006.01)
G01M 11/00 (2006.01)

(52) U.S. Cl.
CPC .......... G01N 21/412 (2013.01); G01M 11/37 (2013.01); *G01N 2201/0826* (2013.01)

(58) Field of Classification Search
CPC ......... G01N 21/412; G01N 2201/0826; G01N 21/4133; G01N 2021/4153; G01M 11/37
See application file for complete search history.

(56) References Cited

U.S. PATENT DOCUMENTS

| | | | | |
|---|---|---|---|---|
| 5,365,329 A | * | 11/1994 | Svendsen ............. | G01N 21/412 |
| | | | | 356/73.1 |
| 9,989,458 B2 | | 6/2018 | Cook et al. | |
| 2010/0245805 A1 | * | 9/2010 | Cook ................... | G01N 21/412 |
| | | | | 356/128 |
| 2016/0123873 A1 | * | 5/2016 | Cook ................... | G01N 21/412 |
| | | | | 356/73.1 |
| 2022/0276124 A1 | | 9/2022 | Schmitt | |

FOREIGN PATENT DOCUMENTS

| | | |
|---|---|---|
| EP | 3889581 A1 | 10/2021 |
| JP | H08201221 A | 8/1996 |

* cited by examiner

*Primary Examiner* — Michelle M Iacoletti
*Assistant Examiner* — Judy Dao Tran
(74) *Attorney, Agent, or Firm* — Panitch Schwarze Belisario & Nadel LLP

(57) ABSTRACT

A method for determining a refractive index profile of an optical object having a cylindrical surface includes: (a) scanning the surface at a first plurality of scanning locations with a pinhole aperture in a path of one or more optical beams; (b) measuring a first deflection function based detecting the optical beams after deflection by the optical object for each of the first plurality of scanning locations; (c) scanning the surface at a second plurality of scanning locations where the path of the optical beams is free of the pinhole aperture; (d) measuring a second deflection function based on detecting the optical beams after deflection by the optical object for each of the second plurality of scanning locations; (e) merging at least portions of the first and second deflection functions to obtain a composite deflection function; and (f) calculating the refractive index profile using the composite deflection function.

16 Claims, 6 Drawing Sheets

ULTRA LOW-NA REFRACTIVE INDEX PROFILING SYSTEM AND METHOD FOR FILTERING OUT SEVERELY DISTURBING DIFFRACTION EFFECTS

CROSS-REFERENCE TO RELATED APPLICATIONS

This application claims priority pursuant to 35 U.S.C. 119 (a) to U.S. Application No. 63/463,621, filed May 3, 2023, which application is incorporated herein by reference in its entirety.

TECHNICAL FIELD

The present disclosure relates generally to refractive index measurements and, more particularly, to systems and methods of determining the refractive index profile of an optical object that reduce the impact of diffraction caused by material effects.

BACKGROUND

Transparent cylindrical objects, such as fiber preforms, optical fibers, light pipes, light tubes, and the like are used in a variety of optical applications. In many instances, it is desirable to know the refractive index profile (RIP) of such objects, since the RIP can, for example, determine wave-guiding or other properties of the object. One way to determine the radial RIP of a cylindrical object is to scan the surface at a plurality of scanning locations using one or more optical beams impinging perpendicularly to a longitudinal cylinder axis of the object. The optical object will deflect the beam(s), and the deflection at each of the scanning locations can be measured to define a deflection angle distribution. The RIP of the object may be reconstructed from the deflection angle distribution.

Unfortunately, this process can be subject to errors caused by mechanical characteristics of the cylindrical object. For example, one method of manufacturing an optical fiber is known as outside vapor deposition (OVD), where layers of the fiber are deposited around a core or other substrate. Microlayer variations in the resulting material lead to significant diffraction when measuring the deflection function. As can be seen in FIG. 8, the diffraction inhibits accurate measurements in the deflection data, causing noise and incorrect values for the final reconstructed RIP.

U.S. Pat. No. 9,989,458 B2 seeks to make higher precision measurements of the RIP for cylindrical glass bodies by identifying the zero-order beam for the deflection measurement and filtering out higher diffraction orders. However, additional information is required in order to accomplish such filtering, and even after the filtering is performed, there still may be too much noise in the data to make an accurate determination.

European Patent Publication No. 3 889 581 A1 attempts to improve the accuracy of RIP calculation by measuring deflection data at different wavelengths through the cylindrical object. However, in cases where the separation between diffraction orders is very small, the required filtering out of the higher orders may be very difficult.

Accordingly, there is a need for a method and system for accurately measuring deflection data for RIP reconstruction that can more easily and reproducibly enable better diffraction separation to significantly reduce the impact of material effects on the RIP determination.

SUMMARY

To meet these and other needs, the present disclosure provides a method for determining a refractive index profile of an optical object having a cylindrical surface and a longitudinal cylinder axis. The method includes: (a) scanning the cylindrical surface of the optical object at a first plurality of scanning locations by one or more optical beams impinging perpendicularly to the longitudinal cylinder axis, with a pinhole aperture being located in a path of the one or more optical beams upstream of the cylindrical surface; (b) measuring a first deflection function of the optical object based on detection of the one or more optical beams after deflection by the optical object for each of the first plurality of scanning locations; (c) scanning the cylindrical surface of the optical object at a second plurality of scanning locations by one or more optical beams impinging perpendicularly to the longitudinal cylinder axis, the path of the one or more optical beams being free of the pinhole aperture; (d) measuring a second deflection function of the optical object based on detection of the one or more optical beams after deflection by the optical object for each of the second plurality of scanning locations; (e) merging at least a portion of the first deflection function with at least a portion of the second deflection function to obtain a composite deflection function; and (f) calculating the refractive index profile of the optical object using the composite deflection function.

In another aspect, the present disclosure provides a system for determining a refractive index profile of an optical object having a cylindrical surface and a longitudinal cylinder axis. The system includes a measuring cell having a light entry surface, a light exit surface, and a cavity disposed therebetween configured to receive the optical object, one or more light sources configured to emit one or more optical beams toward the measuring cell, a stage configured to support the measuring cell, (d) an optical sensor configured to be positioned in a path of the one or more optical beams downstream of the light exit surface of the measuring cell, a pinhole aperture selectively movable into and out of the path of the one or more optical beams upstream of the light entry surface of the measuring cell, and a controller. The controller may be configured to: (i) initiate relative movement between the stage and the one or more light sources and optical sensor, with the pinhole aperture in the path of the one or more optical beams, to cause the one or more optical beams to impinge on the cylindrical surface of the optical object perpendicularly to the longitudinal cylinder axis at a first plurality of scanning locations, (ii) measure a first deflection function of the optical object based on detection by the optical sensor of the one or more optical beams after deflection by the optical object for each of the first plurality of scanning locations, (iii) initiate relative movement between the stage and the one or more light sources and optical sensor, with the pinhole aperture out of the path of the one or more optical beams, to cause the one or more optical beams to impinge on the cylindrical surface of the optical object perpendicularly to the longitudinal cylinder axis at a second plurality of scanning locations, (iv) measure a second deflection function of the optical object based on detection by the optical sensor of the one or more optical beams after deflection by the optical object for each of the second plurality of scanning locations, (v) merge at least a portion of the first deflection function with at least a portion of the second deflection function to obtain a composite deflection function, and (vi) calculate the refractive index profile of the optical object using the composite deflection function.

At least a portion of the first deflection function may include deflection data for one or more of the first plurality of scanning locations and the at least a portion of the second deflection function includes deflection data for one or more of the second plurality of scanning locations. The one or more of the first plurality of scanning locations may be different from the one or more of the second plurality of scanning locations. The composite deflection function may further include portions of the first deflection function corresponding to first scanning locations where the deflected one or more optical beams suffer diffractions caused by microlayer-structured refractive index variations in the optical object, and portions of the second deflection function corresponding to second scanning locations surrounding boundaries between different materials or doping in the optical object. The composite deflection function may further be formed by the portion of the second deflection function spanning from a radial edge position of the optical object to a stitching position, and by the portion of the first deflection function spanning from the stitching position toward the radial center of the optical object.

The pinhole aperture may have a diameter of between about 25 micrometers and about 500 micrometers. More particularly, the pinhole aperture may have a diameter of between about 50 micrometers and about 250 micrometers. The pinhole aperture may be provided on a rotatable wheel, wherein in one orientation of the rotatable wheel, the pinhole aperture is in the path of the one or more optical beams and in at least one other orientation, the pinhole aperture is outside of the path of the one or more optical beams. The rotatable wheel may further include a plurality of pinhole apertures, with each of the plurality of pinhole apertures having a different diameter from the others.

It is understood that embodiments described herein may be used alone or in combinations with each other.

BRIEF DESCRIPTION OF THE DRAWINGS

The following detailed description of embodiments will be better understood when read in conjunction with the appended drawings. It should be understood, however, that the disclosure is not limited to the precise arrangements and instrumentalities shown. In the drawings.

DETAILED DESCRIPTION

Figure 1:
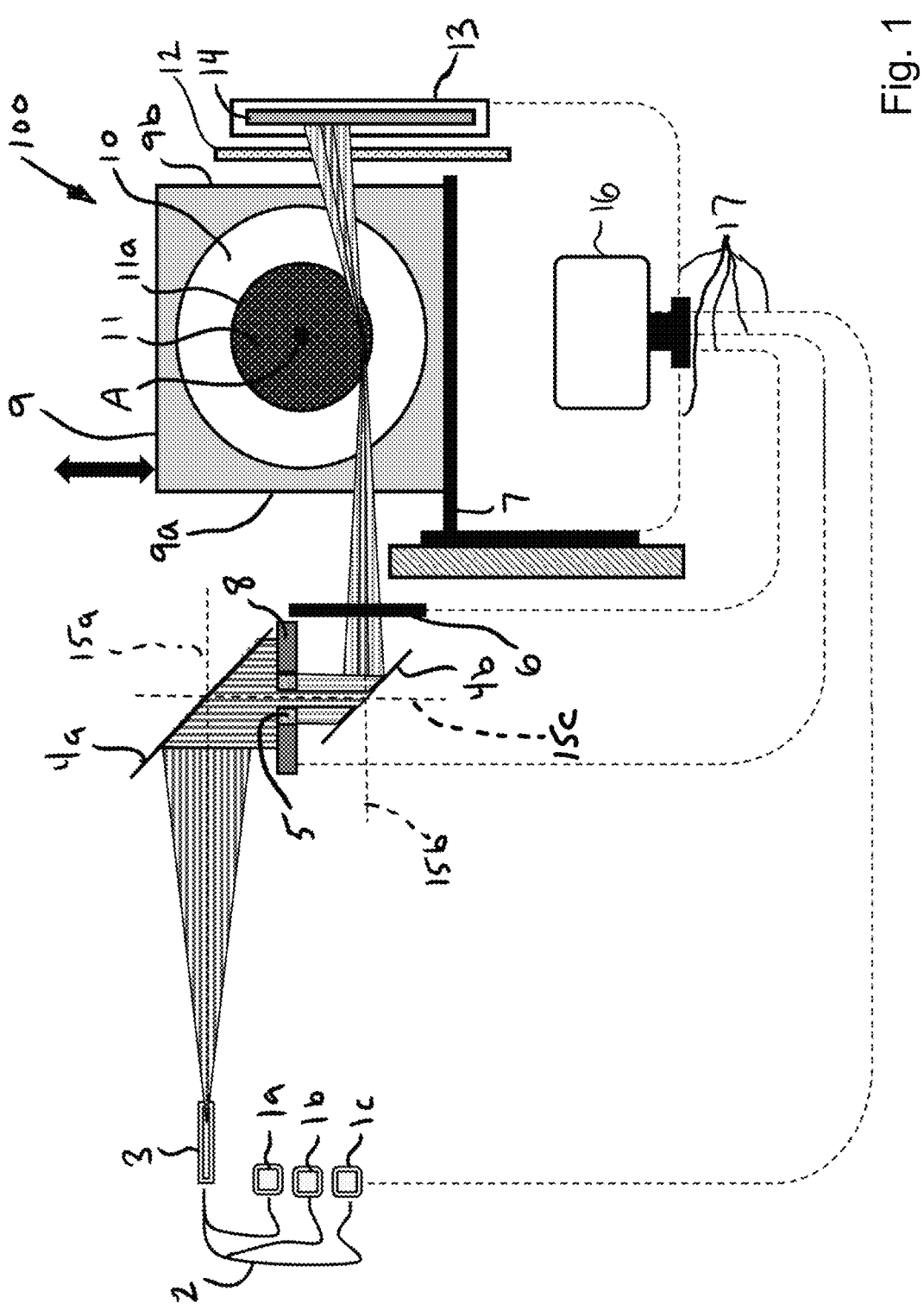
FIG. 1 is a schematic block diagram of an example deflection function measurement system.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

It should also be understood that the terms "about," "approximately," "generally," "substantially" and like terms, used herein when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring now to FIG. 1, there is shown a schematic diagram of an example embodiment of a system 100 that may be used to measure the deflection angle distribution function of a cylindrical optical object 11. The object 11 has a cylindrical surface 11a and a longitudinal cylinder axis A, which in FIG. 1 extends into the page. The optical object 11 may be circular in cross-section, but other cross-sectional shapes may be used as well. The object 11 may be received in a measuring cell 9, which may have a light entry surface 9a, a light exit surface 9b, and a cavity 10 disposed therebetween. The light entry and exit surfaces 9a, 9b may be transparent to one or more wavelengths of light and may be arranged parallel to one another, as shown in FIG. 1, although any conventional measuring cell may be used. The object 11 may be received in the cavity 10, the remainder of which may be filled with an index adjustment fluid (not shown). In an example embodiment, the index adjustment fluid is an oil with a refractive index that is close to, but not the same as, a refractive index of at least the light entry and exit surfaces 9a, 9b of the measurement cell 9.

The system 100 may further include one or more light sources 1a-1c configured to emit optical beams toward the measurement cell 9, either directly or indirectly. Each of the light sources 1a-1c may be a laser diode or a like optical emitter. When more than one light source 1a-1c is used, each light source 1a-1c may provide a different wavelength of light, although it is also possible for one or more the light sources 1a-1c to emit light having the same wavelength. The light sources 1a-1c may each emit optical beams received by one or more coupling fibers 2 that may deliver the optical beam(s) to a beam conditioner 3. The coupling fiber(s) 2 may be single-mode optical fibers (e.g., designed to carry a single mode of light: the transverse mode), although other types of coupling fibers or components for delivering the emitted optical beams may be used as well. The beam conditioner 3 may alter the properties of the optical beam(s).

In the embodiment shown in FIG. 1, the system 100 may include a first optical axis 15a and a second optical axis 15b. The first optical axis 15a in FIG. 1 coincides with the one or more optical beams emanating from the beam conditioner 3. The second optical axis 15b may intercept the light entry and light exit surfaces 9a, 9b of the measurement cell 9 in operation. The first optical axis 15a may be parallel to the second optical axis 15b. In this example, the optical beams travel initially along the first optical axis 15a before being diverted to the second optical axis 15b by a pair of off-axis reflectors 4a, 4b, which may be parabolic mirrors or the like. In an alternative embodiment, the beam conditioner 3 and first reflector 4a may be a single component (not shown). The first reflector 4a may create collimated beams, which are directed toward the second reflector 4b along a third optical axis 15c, which may be oriented perpendicularly with respect to the first and second optical axes 15a, 15b. The second reflector 4b may take the collimated beams received along the third optical axis 15c and focus the beams along the second optical axis 15b. Although the example shown in FIG. 1 has three optical axes 15a, 15b, 15c any number of optical axes may be used as necessary, including a single optical axis, if desired. Moreover, any number of optical elements, including reflectors, lenses, or the like, may be used for the purpose of redirecting, collimating, or focusing the one or more optical beams, as desired.

The focused beams that reflect from the second reflector 4b may pass through an optical shutter 6 prior to entering the measuring cell 9. During operation, the shutter 6 may remain in a closed position and then open when a pulse control signal is applied. For example, as long as a control voltage to the shutter 6 remains high, the shutter 6 may stay open. As soon as the voltage goes low, however, the shutter 6 may close, providing inherent "fail-safe" operation, i.e., security. However, the shutter 6 may be operated in any conventional manner for deflection measurements.

The one or more optical beams may enter the measuring cell 9 through the light entry surface 9a to impinge on the cylindrical surface 11a of the optical object 11 perpendicularly (e.g., 90°±5°) to the longitudinal cylinder axis A. The optical beams are refracted by the optical object 11 by a deflection angle, which may be defined by a path of the exiting optical beams relative to the path of the originally incident optical beams. The refracted optical beams may exit the measuring cell 9 through the light exit surface 9b for detection by an optical sensor 14 downstream of the light exit surface 9b. The optical sensor 14 may be part of a camera 13, such as a line scan camera or the like. The optical sensor 14 may be a CMOS sensor, a CCD sensor, or the like and may include one or more rows of active pixels. The optical sensor 14 may send corresponding detector signals to a controller 16, described in further detail below. A filter 12 may be positioned between the measuring cell 9 and the optical sensor 14, and may help to preclude environmental light from adversely impacting measurements. In the example of FIG. 1, the filter 12 may be an infrared long pass filter, although other types may be used as well.

Measuring a deflection function implicates measuring deflection angles over a plurality of scanning locations (e.g., at varying heights relative to the central longitudinal axis A of the optical object 11). It is therefore helpful to enable relative movement of the measuring cell 9 with respect to the one or more light sources 1a-1c and the optical sensor 14. In FIG. 1, this is accomplished by supporting the measuring cell 9 with a stage 7, which in this example is a linear stage configured for moving the measuring cell 9 vertically with respect to the optical sensor 14. The stage 7 may be motorized and movable based on commands received from the controller 16, although other methods for moving the stage 7 may be used as well.

Although in the embodiment illustrated in FIG. 1 the object 11 in the measuring cell 9 is moved (e.g., scanned), in another embodiment other components (such as the light sources 1a-1c or the beam conditioner 3) may be moved simultaneously (e.g., scanned) relative to the object 11 (which may be held stationary or may move in the opposite direction) so that the optical beam height can be varied in order to send the optical beam through different parts of the optical object 11. Other arrangements for adjusting the scanning locations on the optical object 11 (e.g., movable mirrors or the like) may also be used.

The controller 16 may be, for example, a computer that includes a processor unit (e.g., a CPU), a memory unit, and support circuitry all operably interconnected. The processor may be or include any form of a general-purpose computer processor that can be used in an industrial setting. The memory unit may include a computer-readable medium capable of storing instructions (e.g., software) that direct the processor to carry out the methods as described in detail below. The memory unit may be, for example, random-access memory, read-only memory, floppy or hard disk drive, or other form of digital storage. In an example embodiment, the instructions stored in the memory unit are in the form of software that, when executed by the processor, transform the processor into a specific-purpose processor that controls (i.e., directs or causes) the system 100 to carry out one or more of the methods described below. The support circuitry is operably (e.g., electrically) coupled to the processor and may include cache, clock circuits, input/output sub-systems, power supplies, control circuits, and the like. It should be further appreciated that controller 16 is shown schematically in this example as a single component, but may include a plurality of individual devices, with control functions divided among the individual devices.

The one or more light sources 1a-1c, the shutter 6, the stage 7, the optical sensor 14, and potentially other components, may each be configured to send signals and data to, and receive signals and data from, the controller 16 along a plurality of data connections 17. The data connections 17 may be wired or wireless; any conventional data connections 17 as would be known to an artisan are suitable.

To aid in diffraction order separation, a pinhole aperture 5 may be selectively movable into and out of a path of the optical beams upstream of the light entry surface 9a of the measuring cell 9. In the example shown in FIG. 1, the pinhole aperture 5 may be located for insertion into the beam path between the two off-axis reflectors 4a, 4b. However, the pinhole aperture 5 may be positionable in other locations along the beam path as well. The pinhole aperture 5 is preferably generally circular in shape, with a diameter which may be selected as a function of the material (e.g., spacing of the microlayer structures, material composition, and the like) and/or size of the optical object 11, along with other considerations of the system 100. In particular, smaller pinhole apertures will provide better diffraction order separation for a smoother deflection function, but the smaller the pinhole aperture gets, the aperture itself can generate its own diffraction. Smaller pinhole apertures are also more difficult to align, and an aperture off-center by even a few micrometers at very low diameters can cause "half moon-shaped" beam profiles, which create problems further downstream. Smaller pinhole apertures also absorb more light intensity, requiring longer exposure times and, therefore, longer measurement times. Accordingly, the diameter of the pinhole aperture 5 may be a balance of being large enough to avoid the problems described above, but small enough (with appropriate tolerances) to properly separate the material-caused diffraction orders. In general, the diameter of the pinhole aperture 5 may be between about 25 micrometers and about 500 micrometers. More preferably, the diameter of the pinhole aperture 5 may be between about 50 micrometers and about 250 micrometers. In these diameter ranges, it has generally been found that the pinhole aperture 5 is able to adequately separate diffraction orders caused by material differences to allow for more accurate deflection measurements, while minimizing the negative effects from smaller aperture sizes.

Figure 2:
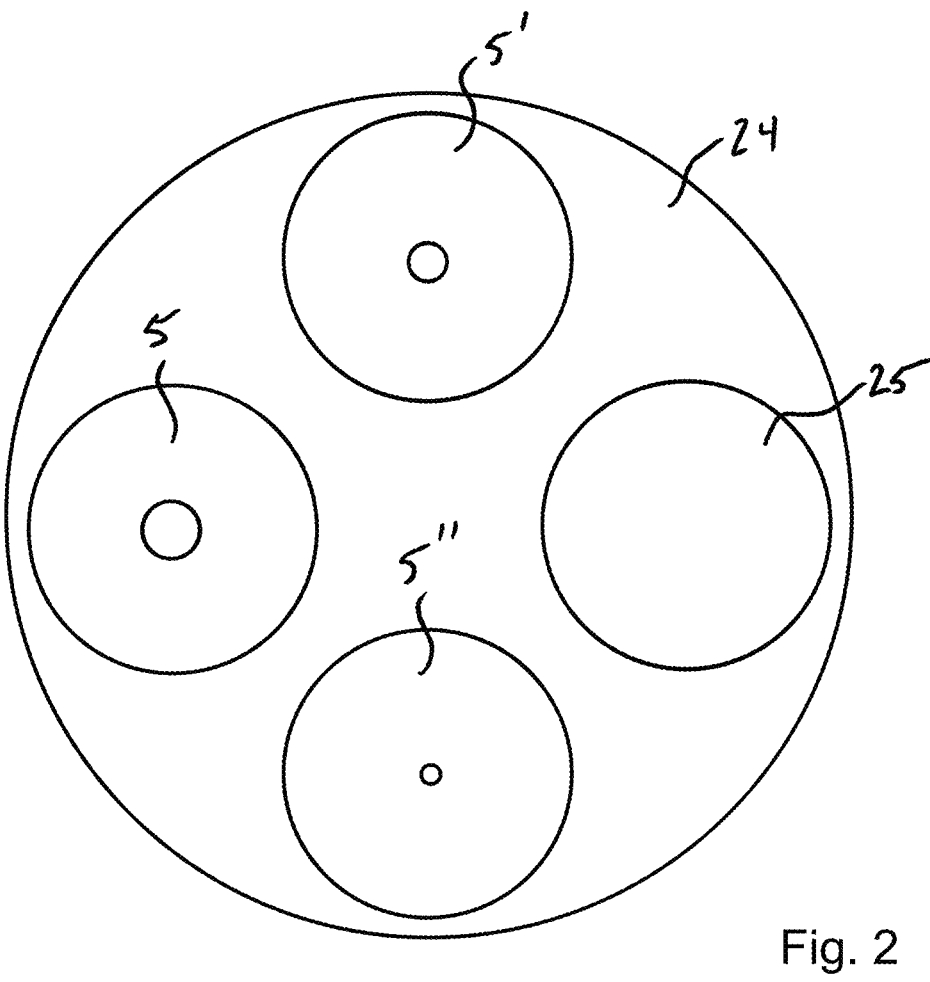
FIG. 2 is a top plan view of a rotatable wheel having multiple pinhole apertures.

In the example of FIG. 1, the pinhole aperture 5 is supported in a tray 8, which may be movable in response to commands from the controller 16. The pinhole aperture 5 may be retained in the tray 8 by a snap-in engagement, friction fit, mechanical fasteners, or the like. The pinhole aperture 5 may be removable from the tray 8 for replacement by other pinhole apertures (not shown) of different diameters. The tray 8 may have an unobstructed opening (not shown) to allow conventional passage of the optical beams, or may move completely out of the beam path when necessary. FIG. 2 shows an alternative example, wherein the pinhole aperture 5 is provided on a rotatable wheel 24 that may be mounted near the beam path in the system 100. In one rotational orientation of the rotatable wheel 24, the pinhole aperture 5 may be moved into the optical beam path. In at least one other rotational orientation, the pinhole aperture 5 may be located outside of the optical beam path. In the example of FIG. 2, the rotatable wheel 24 includes an opening 25 having a more conventional diameter for deflection measurement (e.g., 2 mm or larger) and allowing substantially more of the optical beam(s) to pass through than the pinhole aperture 5. FIG. 2 also depicts that pinhole apertures 5', 5" of differing diameters from each other may be located in the rotatable wheel 24, and can be used as needed. In still another embodiment, the pinhole aperture 5 may be formed by a mechanically adjustable iris (not shown), although it has been found that the blades of an iris may cause polygon shaped beam deformation and additional unwanted polygon-shaped diffractions. Still other methods for being able to move the pinhole aperture 5 into and out of the beam path may be used as well, for reasons discussed in further detail below.

Figure 4:
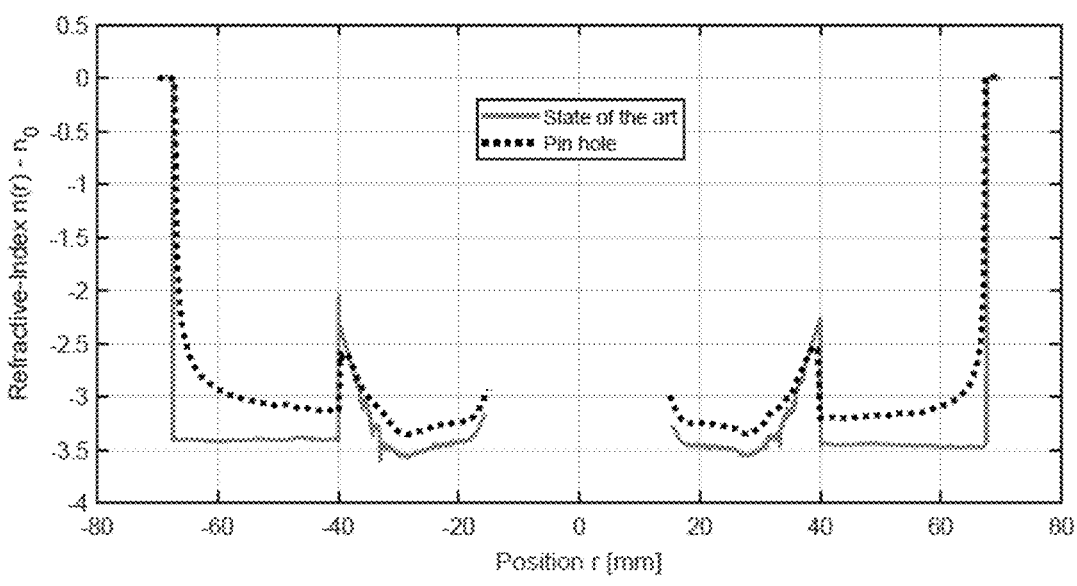
FIG. 4 is a comparison of a refractive index distribution calculated from data measured by a conventional deflection measurement system against a refractive index distribution calculated from deflection data measured using a pinhole.
Figure 8:
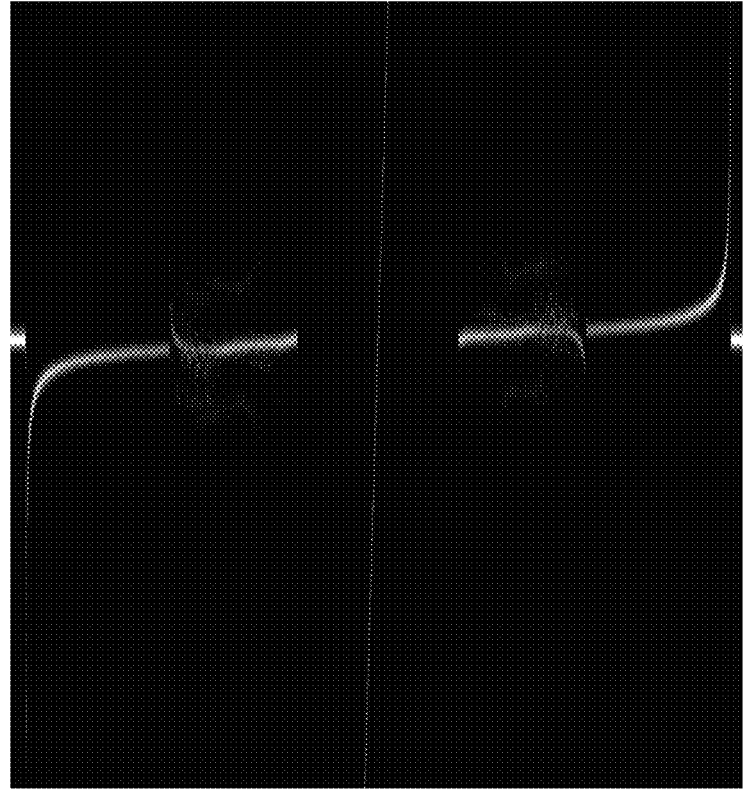
FIG. 8 is a deflection measurement image using a conventional system and method.
Figure 3:
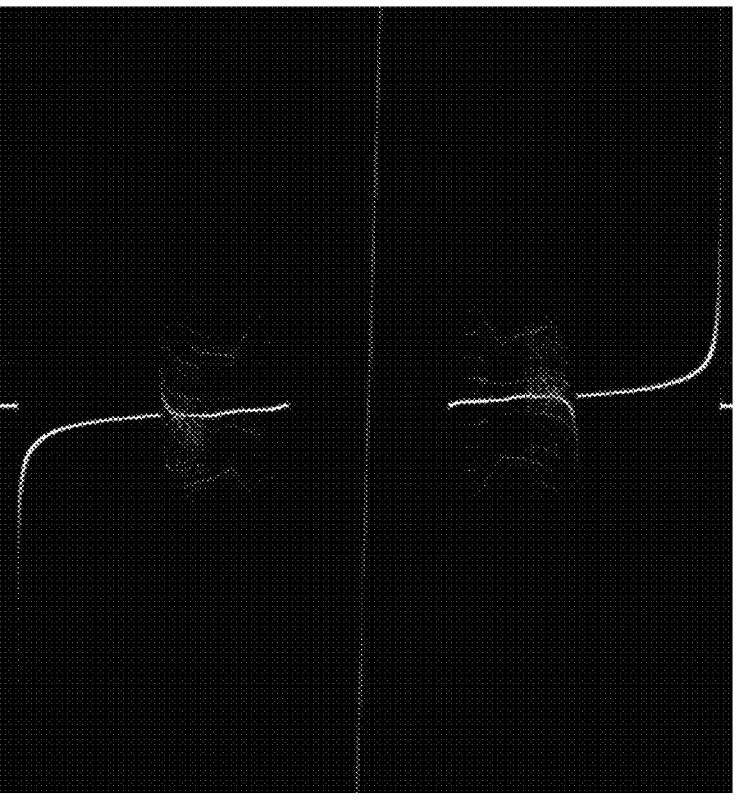
FIG. 3 is a deflection measurement image showing significant diffraction separation as a result of use of the example system of FIG. 1.

FIG. 3 shows that use of the pinhole aperture 5 in the beam path creates better separation of the diffractions (as compared with, for example, FIG. 8), which enables better deflection measurement accuracy with less noise in areas suffering from material effects, such as microlayer variations. The result is improved RIP reconstruction in these regions, using mainly a hardware-centric solution, as shown in FIG. 4. However, it has been found that deflection measurements using the pinhole aperture 5 in other regions, such as locations of transitions between different materials or doping, can be negatively affected. Looking again at FIG. 4, sharp spikes in deflection measurements can occur at material transition boundaries. The RIP in these areas using the pinhole aperture 5 measurements is less accurate, as represented by the rounded curves and gradual declines in the RIP calculated using the setup of FIG. 1 as compared to the conventional approach providing sharp spikes and relatively flat regions. It is for this reason that the methods described below utilize deflection measurements both with and without the presence of the pinhole aperture 5.

Figure 5:
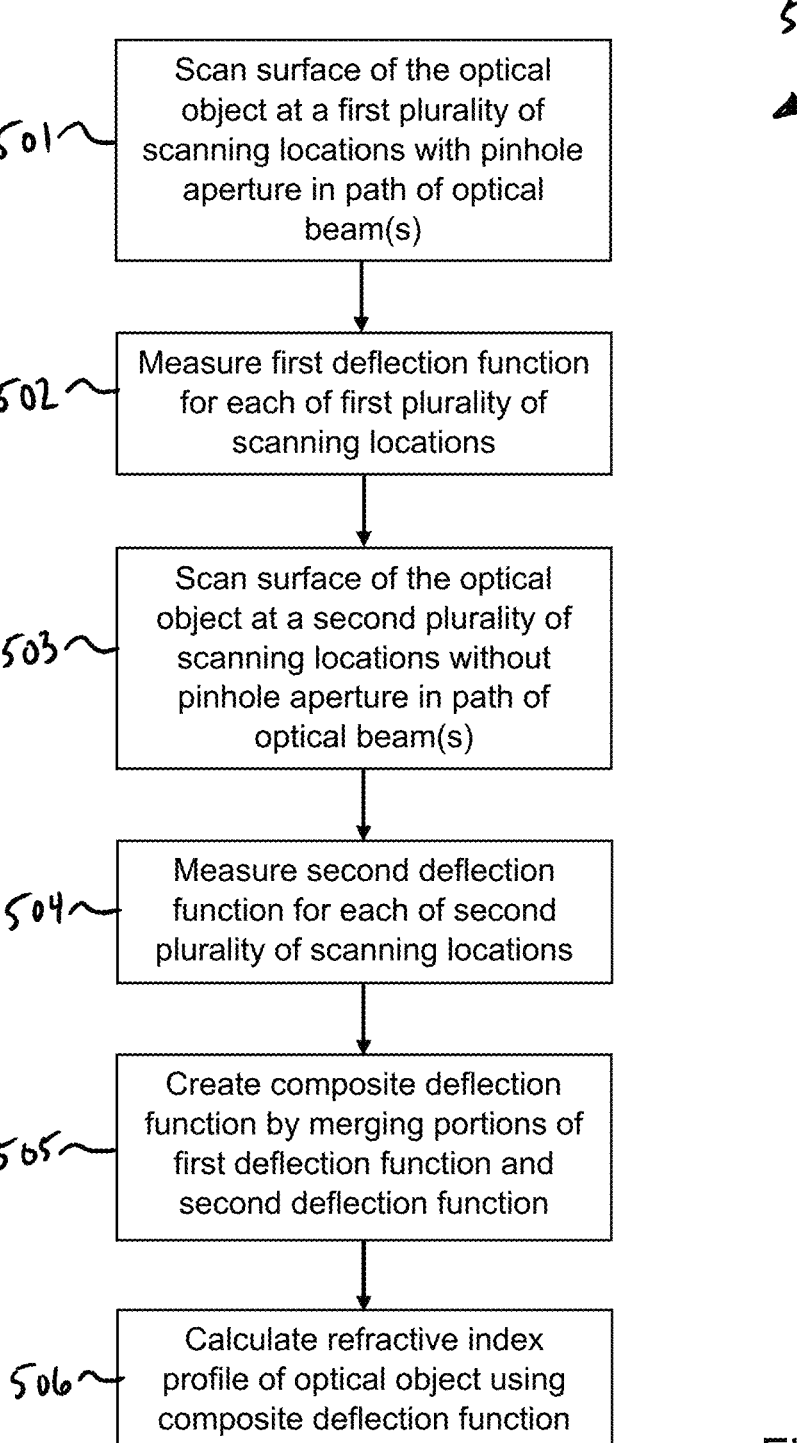
FIG. 5 is a flow diagram for a method of measuring deflection data and calculating a refractive index profile.

FIG. 5 shows an example embodiment of a method 500 for determining a RIP for an optical object 11, which may be performed using the system 100 shown in FIG. 1 or other embodiments thereof by the controller 16 and/or other processing device (not shown). At step 501, the surface of the optical object 11 is scanned at a first plurality of scanning locations by the one or more optical beams impinging perpendicularly to the longitudinal cylinder axis A. For this purpose, the controller 16 may initiate relative movement between the stage 7 and the one or more light sources 1a-1c and optical sensor 14 to attain each of the first plurality of scanning locations. The pinhole aperture 5 may be located in the optical beam path during the scanning process. At step 502, the first deflection function for each of the first plurality of scanning locations is measured at the optical sensor 14. For example, the first deflection function includes deflection data for one or more of the first plurality of scanning locations.

At step 503, the surface of the optical object 11 is scanned at a second plurality of scanning locations by the one or more optical beams impinging perpendicularly to the longitudinal cylinder axis A. For this step, the optical beam path is free of the pinhole aperture 5 (i.e., the pinhole aperture 5 is not in the path of the optical beam(s) during the scanning process). Again, the controller 16 may initiate relative movement between the stage 7 and the one or more light sources 1a-1c and optical sensor 14 to attain each of the second plurality of scanning locations. At step 504, the second deflection function for each of the second plurality of scanning locations is measured at the optical sensor 14. For example, the second deflection function includes deflection data for one or more of the second plurality of scanning locations.

Thus, two deflection functions are measured for the optical object 11—one with the pinhole aperture 5 in place, and the other without. While FIG. 5 shows that the first deflection function (i.e., with the pinhole aperture 5) is measured first, in some embodiments, the second deflection function (i.e., without the pinhole aperture 5) may be measured first, and the data using the pinhole aperture 5 may be acquired subsequently. In some embodiments, the system 100 may alternate measuring the first and second deflection functions at each scanning location. For example, the first deflection function may be measured for a particular scanning location, then the pinhole aperture 5 may be removed and the second deflection function may be measured for the same scanning location before the system 100 proceeds to the next scanning location where the process may be repeated. In some embodiments, it may be possible to acquire the first and second deflection functions generally simultaneously, such as by using multiple beam paths (not shown) or the like. The order in which the first and second deflection functions are acquired is not critical to the method.

Figure 6:
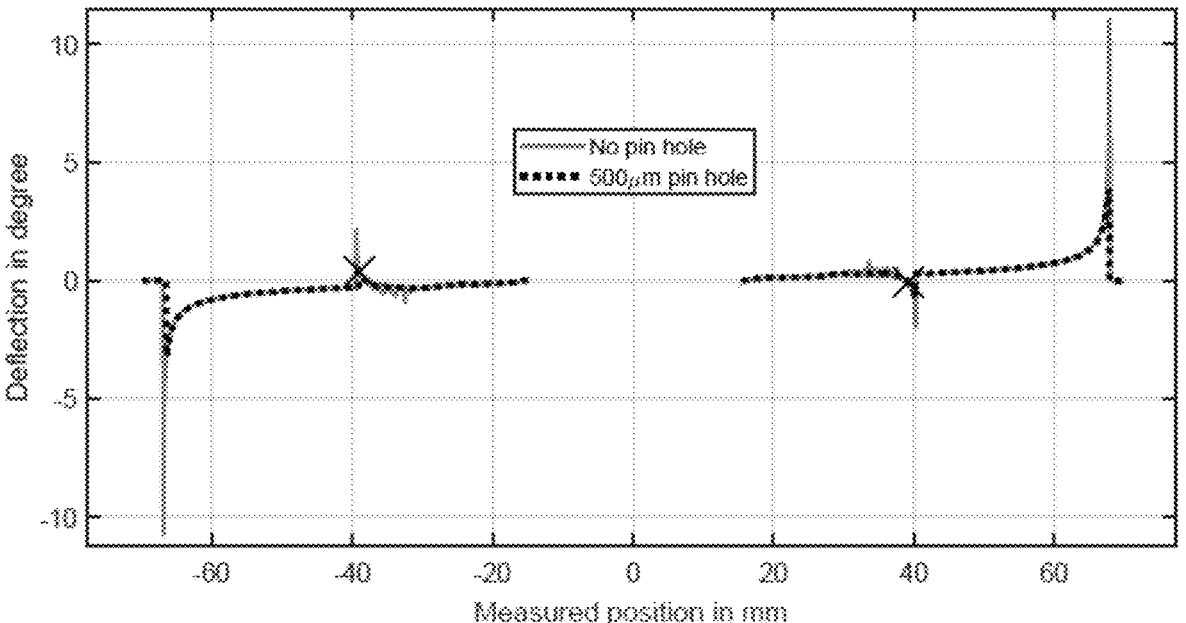
FIG. 6 is a comparison of a deflection function measured using a pinhole aperture against a deflection function measured without a pinhole aperture, and showing stitching locations between the two for formation of a composite deflection function.

At step 505, a composite deflection function is created by merging at least a portion of the first deflection function with at least a portion of the second deflection function. FIG. 6 shows an example. The second deflection function ("No pinhole") in the curve exhibits sharp spikes on both sides of center of the optical object 11, which correspond to material or doping boundaries. However, as the second deflection function approaches the center position, microlayer variations cause noise in the measurement, depicted as numerous and variable fluctuations in the curve. The first deflection function ("500 mum pinhole"), wherein a 500 micrometer pinhole aperture 5 is introduced into the optical beam path, exhibits a much smoother curve where the microlayer variations are present. This is because the diffraction orders are sufficiently separate such that the zero-order diffraction alone may be extracted. However, the sharp transitions at the material boundaries do not reach the values found without the pinhole aperture 5.

The composite deflection function in this example is created by merging portions of the first deflection function corresponding to first scanning locations where the deflected one or more optical beams suffer diffractions caused by microlayer-structured refractive index variations in the optical object 11 (e.g., where the second deflection function exhibits the noise), and portions of the second deflection function corresponding to second scanning locations surrounding boundaries between different materials or doping in the optical object 11 (e.g., where the sharp spikes occur). The two deflection functions may be stitched together at the locations marked by an "X" in FIG. 6. That is, in this example, the composite deflection function uses the second deflection function data from a radial edge portion of the optical object 11 (or alternatively a reference position inside or outside of the radial edge of the optical object 11) until the sharp spikes occurring proximate to the −40 and 40 mm measured positions. Between these two stitching positions for this example, the composite deflection function uses the first deflection function data toward the radial center of the optical object. Stitching positions can be located where the two deflection functions overlap or cross. In this example, the two deflection functions overlap just inside of the short boundary spikes, and the stitching positions are preferably located in that position to obtain the optimal composite deflection curve for calculating RIP. However, stitching positions may be located anywhere it is determined that desirable data from the first or second deflection function is sought. Although FIG. 6 depicts one stitching position on each side of center of the optical object 11, any number of stitching positions can be used, if needed. For example, where multiple discrete portions of each of the first or second deflection functions are to be used.

FIG. 6 shows that the first and second deflection functions each cover the same range of scanning locations on the optical object 11. However, it is not necessary that the first and second pluralities of scanning locations be identical over the range. For example, if the stitching position is generally known in advance, the second deflection function may be measured for the scanning locations up to or just beyond the stitching position. The first deflection function may similarly be measured for scanning locations from approximately the stitching position. This can speed up the measurement process by not spending time measuring deflection functions in regions that will not be used in the final composite deflection function. Other variations between the first and second pluralities of scanning locations can be used as well.

Figure 7A:
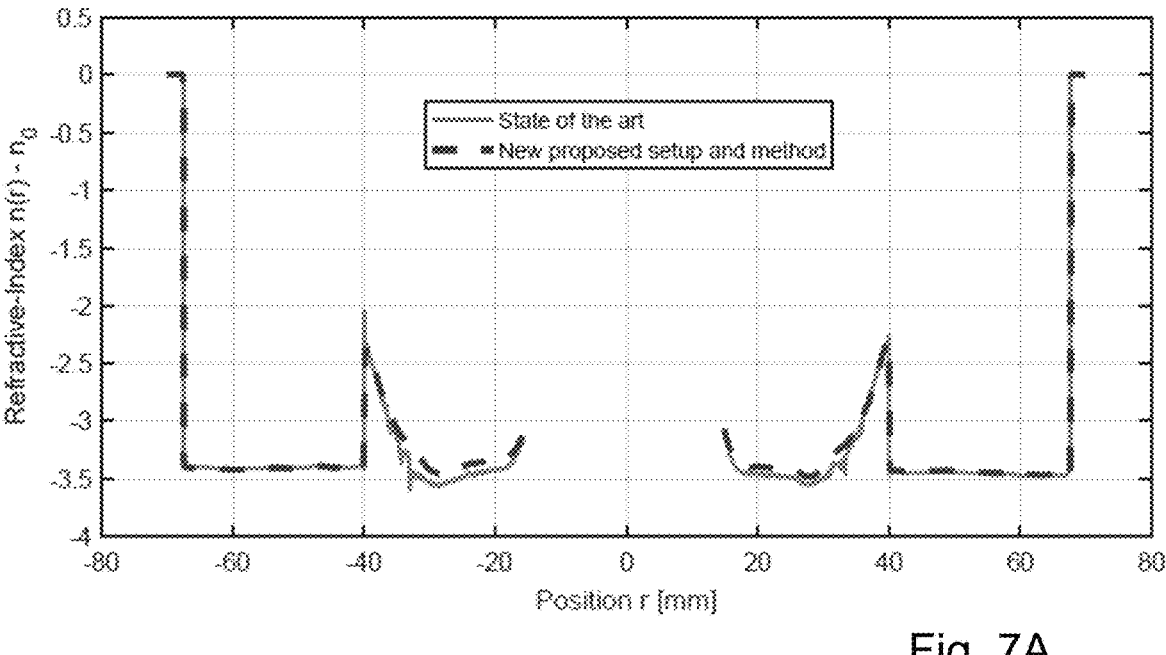
FIG. 7A is a comparison of a refractive index distribution calculated from data measured by a conventional deflection measurement system against a refractive index distribution calculated using the method of FIG. 5.
Figure 7B:
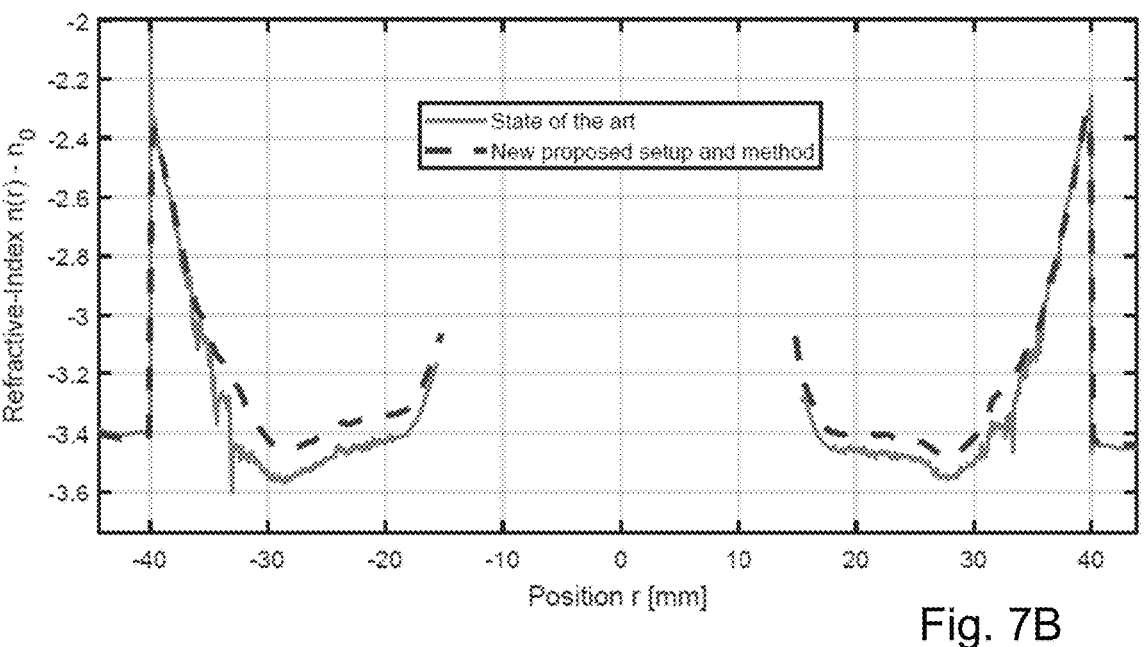
FIG. 7B is an enlargement of a central portion of the plot of FIG. 7A.

Referring again to FIG. 5, at step 506, the RIP of the optical object 11 can be calculated from the composite deflection function. Mathematically, this can be achieved by, e.g., numerical integration, applying the inverse Abel-transformation (as known in the literature and by those skilled in art), the inverse Radon-transformation (e.g., in the case of a non-radii-symmetric optical object 11), or other similar techniques. However, as the calculated RIP may suffer from the well-known RI profiling measurement artifact of rounded boundaries near sharp RI steps, underestimated RI differences, and the like, it is preferable to apply improved evaluation methods on the composite deflection function, which are able to overcome these errors related to the measurement artifacts. One skilled in the art may select the particular evaluation routine based on the given circumstances, such as, but not limited to, the particular optical object 11 and its resulting features in the composite deflection function. The deflection function is the basis for any of these methods. Therefore, it is understood that with the improved and more accurate composite deflection function attained in accordance with the method described above, the resulting RIP will also be more accurate. FIGS. 7A-7B show an example comparison of an RIP calculated in a conventional deflection measurement system and technique against an RIP calculated based on the system and method described above. As can be seen, the RIP has less noise and shows improved value determination, particularly as the center of the optical object is approached.

While the above method has been described as utilizing two deflection functions to attain the composite deflection function, three or more deflection functions may be used as well, where necessary.

Those skilled in the art will recognize that boundaries between the above-described operations are merely illustrative. The multiple operations may be combined into a single operation, a single operation may be distributed in additional operations and operations may be executed at least partially overlapping in time. Further, alternative embodiments may include multiple instances of a particular operation, and the order of operations may be altered in various other embodiments.

While specific and distinct embodiments have been shown in the drawings, various individual elements or combinations of elements from the different embodiments may be combined with one another while in keeping with the spirit and scope of the disclosure. Thus, an individual feature described herein only with respect to one embodiment should not be construed as being incompatible with other embodiments described herein or otherwise encompassed by the disclosure.

It will be appreciated by those skilled in the art that changes could be made to the embodiments described above without departing from the broad concepts embodied therein. It is understood, therefore, that the present disclosure is not limited to the particular embodiments disclosed, but it is intended to cover modifications within the spirit and scope of the present disclosure.

We claim:

1. A method for determining a refractive index profile of an optical object having a cylindrical surface and a longitudinal cylinder axis, the method comprising:

(a) scanning the cylindrical surface of the optical object at a first plurality of scanning locations by one or more optical beams impinging perpendicularly to the longitudinal cylinder axis, a pinhole aperture being located in a path of the one or more optical beams upstream of the cylindrical surface;

(b) measuring a first deflection function of the optical object based on detection of the one or more optical beams after deflection by the optical object for each of the first plurality of scanning locations;

(c) scanning the cylindrical surface of the optical object at a second plurality of scanning locations by one or more optical beams impinging perpendicularly to the longitudinal cylinder axis, the path of the one or more optical beams being free of the pinhole aperture;

(d) measuring a second deflection function of the optical object based on detection of the one or more optical beams after deflection by the optical object for each of the second plurality of scanning locations;

(e) merging at least a portion of the first deflection function with at least a portion of the second deflection function to obtain a composite deflection function; and (f) calculating the refractive index profile of the optical object using the composite deflection function.

2. The method of claim 1, wherein the at least a portion of the first deflection function includes deflection data for one or more of the first plurality of scanning locations and the at least a portion of the second deflection function includes deflection data for one or more of the second plurality of scanning locations, the one or more of the first plurality of scanning locations being different from the one or more of the second plurality of scanning locations.

3. The method of claim 1, wherein the composite deflection function includes portions of the first deflection function corresponding to first scanning locations where the deflected one or more optical beams suffer diffractions caused by microlayer-structured refractive index variations in the optical object, and portions of the second deflection function corresponding to second scanning locations surrounding boundaries between different materials or doping in the optical object.

4. The method of claim 1, wherein the composite deflection function is formed by the portion of the second deflection function spanning from a radial edge position of the optical object to a stitching position, and by the portion of the first deflection function spanning from the stitching position toward the radial center of the optical object.

5. The method of claim 1, wherein the pinhole aperture has a diameter of between about 25 micrometers and about 500 micrometers.

6. The method of claim 5, wherein the pinhole aperture has a diameter of between about 50 micrometers and about 250 micrometers.

7. The method of claim 1, wherein the pinhole aperture is provided on a rotatable wheel, wherein in one orientation of the rotatable wheel, the pinhole aperture is in the path of the one or more optical beams and in at least one other orientation, the pinhole aperture is outside of the path of the one or more optical beams.

8. The method of claim 7, wherein the rotatable wheel includes a plurality of pinhole apertures, each of the plurality of pinhole apertures having a different diameter from the others.

9. A system for determining a refractive index profile of an optical object having a cylindrical surface and a longitudinal cylinder axis, the system comprising:

(a) a measuring cell having a light entry surface, a light exit surface, and a cavity disposed therebetween configured to receive the optical object;

(b) one or more light sources configured to emit one or more optical beams toward the measuring cell;

(c) a stage configured to support the measuring cell;

(d) an optical sensor configured to be positioned in a path of the one or more optical beams downstream of the light exit surface of the measuring cell;

(e) a pinhole aperture selectively movable into and out of the path of the one or more optical beams upstream of the light entry surface of the measuring cell; and (f) a controller configured to:

(i) initiate relative movement between the stage and the one or more light sources and optical sensor, with the pinhole aperture in the path of the one or more optical beams, to cause the one or more optical beams to impinge on the cylindrical surface of the optical object perpendicularly to the longitudinal cylinder axis at a first plurality of scanning locations, (ii) measure a first deflection function of the optical object based on detection by the optical sensor of the one or more optical beams after deflection by the optical object for each of the first plurality of scanning locations, (iii) initiate relative movement between the stage and the one or more light sources and optical sensor, with the pinhole aperture out of the path of the one or more optical beams, to cause the one or more optical beams to impinge on the cylindrical surface of the optical object perpendicularly to the longitudinal cylinder axis at a second plurality of scanning locations, (iv) measure a second deflection function of the optical object based on detection by the optical sensor of the one or more optical beams after deflection by the optical object for each of the second plurality of scanning locations, (v) merge at least a portion of the first deflection function with at least a portion of the second deflection function to obtain a composite deflection function, and (vi) calculate the refractive index profile of the optical object using the composite deflection function.

10. The system of claim 9, wherein the at least a portion of the first deflection function includes deflection data for one or more of the first plurality of scanning locations and the at least a portion of the second deflection function includes deflection data for one or more of the second plurality of scanning locations, the one or more of the first plurality of scanning locations being different from the one or more of the second plurality of scanning locations.

11. The system of claim 2, wherein the controller is configured to obtain the composite deflection function by merging portions of the first deflection function corresponding to first scanning locations where the deflected one or more optical beams suffer diffractions caused by microlayer-structured refractive index variations in the optical object, and portions of the second deflection function corresponding to second scanning locations surrounding boundaries between different materials or doping in the optical object.

12. The system of claim 9, wherein the controller is configured to obtain the composite deflection function by merging the portion of the second deflection function spanning from a radial edge position of the optical object to a stitching position, and the portion of the first deflection function spanning from the stitching position toward the radial center of the optical object.

13. The system of claim 9, wherein the pinhole aperture has a diameter of between about 25 micrometers and about 500 micrometers.

14. The system of claim 13, wherein the pinhole aperture has a diameter of between about 50 micrometers and about 250 micrometers.

15. The system of claim 9, further comprising a rotatable wheel, the pinhole aperture being provided on the rotatable wheel such that in one orientation of the rotatable wheel, the pinhole aperture is in the path of the one or more optical beams and in at least one other orientation, the pinhole aperture is outside of the path of the one or more optical beams.

16. The system of claim 15, wherein the rotatable wheel includes a plurality of pinhole apertures, each of the plurality of pinhole apertures having a different diameter from the others.

* * * * *